Feb. 3, 1959 J. O. WELDON 2,871,545
HIGH VOLTAGE CAPACITOR
Filed July 2, 1957 2 Sheets-Sheet 1
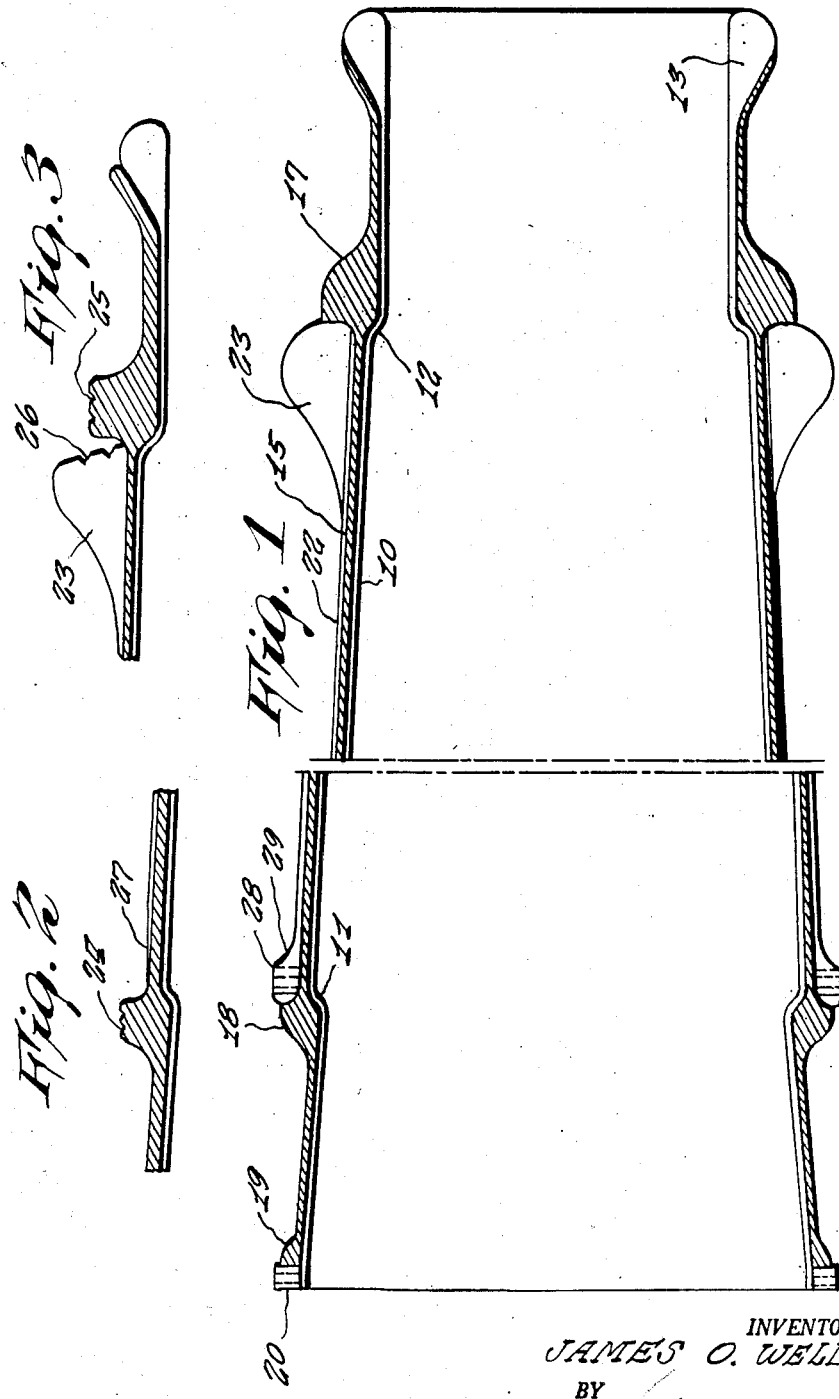
INVENTOR.
JAMES O. WELDON
BY
Moses, Nolte & Nolte
ATTORNEYS

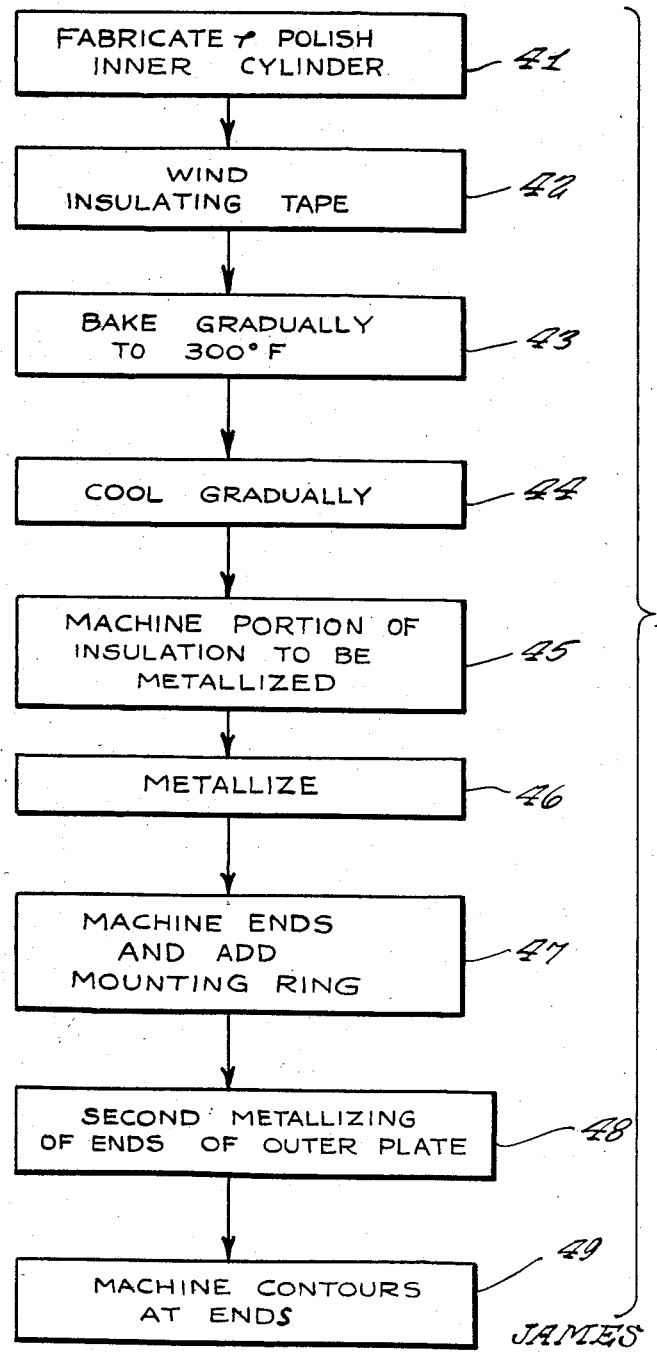

United States Patent Office 2,871,545
Patented Feb. 3, 1959

2,871,545

HIGH VOLTAGE CAPACITOR

James O. Weldon, Dallas County, Tex.

Application July 2, 1957, Serial No. 669,581

9 Claims. (Cl. 29—25.42)

The present invention relates to capacitors and the method of making the same and more particularly to high voltage radio frequency capacitors.

There have been considerable difficulties in the past in manufacturing suitable capacitors for blocking, by-passing and other applications, particularly in connection with high power radio frequency transmitting equipment. Most dielectric materials have rather high losses at high, very high or ultra high frequencies, and it has been extremely difficult to obtain sufficiently high voltage breakdown ratings for direct current voltage blocking and at the same time sufficiently low loss to avoid heating of the dielectric. Another difficulty has been that some of the widely used dielectrics such as "Teflon" support minute amounts of corona which sublimates the "Teflon" and causes it to disappear from the critical areas.

It is an object of this invention to produce a capacitor which is free of the above-mentioned defects.

Another object of the invention is to provide a high voltage capacitor which is completely free of any air voids between the metallic plates and the dielectric. This is done by making the dielectric and metal plates continuously coherent throughout the surfaces where voltage gradient exists through the dielectric and also coherent throughout an area at the end of the metal plates, where there is a critical requirement with regard to the radius at which the plates spread apart.

Another object of the invention is to provide a sufficient thickness of dielectric material at the end of one of the metallic plates, so as not to exceed a critical maximum value of voltage per unit length of the dielectric material between the opposing plates.

Another object of the invention is to produce a high voltage radio frequency capacitor having improved characteristics. For example, a capacitor manufactured according to the process which will be described hereinafter, operated at a D. C. voltage of 20,000 volts with a radio frequency current flowing through the capacitor as high as 400 to 450 amperes at 30 megacycles.

The invention will be fully understood from the following description and the drawings in which:

Fig. 1 is a longitudinal cross section of a capacitor according to the invention;

Figs. 2 and 3 are detailed sectional views of portions of the capacitor;

Fig. 4 is a flow chart of the process of manufacturing the capacitor.

Reference is made to the drawing illustrating one embodiment of the invention. A hollow metallic cylinder 10 is machined to the shape shown in Fig. 1. The cylinder is shown as being tapered. Near either end of the cylinder, circumferential shoulders 11 and 12 are provided. At its smaller end the cylinder is thickened to provide a large smooth circumferential bead 13. It will be understood, of course, that instead of a hollow metallic cylinder, a solid rod may be used as the inner plate of the capacitor. After the cylinder has been machined to its desired shape and dimensions, its outer surface is polished.

After cylinder 10 has been fabricated and polished, it is wound with an insulating tape over substantially its entire area. The tape is formed of an encapsulating material which has the property of shrinking lengthwise when it is heated to a predetermined temperature. An insulating tape which has been found highly satisfactory for this purpose, is an electron bombarded polyethylene film sold by the General Electric Company under the trade name "Irrathene," type 210. The winding of the tape is continued until its thickness on the cylinder is about 50% greater than the ultimately desired thickness of the dielectric through the active area of the capacitor. Additional tape is wound to make pile-ups 17, 18 at each shoulder of the cylinder and at one end 19 adjacent a tapped mounting ring 20.

After the winding of the tape is completed, the metal cylinder with the tape on it is subjected to a closely controlled heating and cooling cycle. One example of a satisfactory heating cycle, consists of baking for ½ hour at each of the following temperatures: 100°, 120°, 140°, 160°, 180° etc. to 300° F. Thereafter, the tape wound cylinder is allowed to cool by cutting off the oven, and leaving the oven door closed until cooling to approximately room temperature has occurred. The heating of the "Irrathene" tape to 300° causes it to shrink very considerably lengthwise along the tape. Furthermore, the heating process described above, causes the individual layers of tape to disappear and the entire winding becomes a homogeneous mass around the cylinder. Due to the shrinking of the tape when it is heated, it tends to squeeze itself tightly against the inner cylinder, forcing all air out of the area between the tape and the metal cylinder and forcing all air out between the layers of the tape to form a tight-fitting, closely coherent, solid cylinder of insulation around the inner metallic cylinder.

The machining, tape winding, baking and cooling steps described above are indicated by blocks 41 to 44 in the flow chart of Fig. 4.

After the heating and cooling cycle, the structure is removed from the oven and placed in a lathe, where it is turned down to the desired shape and provided with a very smooth surface at least between the shoulders 11 and 12. This step is indicated by block 45 of the flow chart. While still in the lathe, the cylinder is then metalized, as indicated at 46 of the flow chart. The metal coating 22 is applied preferably, by a spray process which utilizes an oxyacetylene torch to which a metal wire is fed. An air blast is used to blow the molten metal out of the torch flame, giving an appearance of spray similar to spray painting with a paint gun. By turning the cylinder in the lathe and applying the metal spray evenly along its length, while taking due precautions with regard to providing cooling in order to avoid excessive temperatures, the insulating cylinder is coated with a metal to form the outside cylindrical capacitor plate 22. In one particular metallizing process which has been used, a thin coating of zinc is first applied, which adheres tightly to the insulation, and this is followed with a coating of aluminum which is applied until a sufficient thickness has been built up. These metals are mentioned merely as examples and it will be understood that others may readily be used. In addition, sufficient metal is sprayed at one end to form a corona ring 23.

After the above described spraying process, the portions of the capacitor adjacent the shoulders, are machined to the shape shown in Figs. 2 and 3. The insulating material is provided with circumferential grooves 24 and 25 and the corona ring 23 may be likewise provided with grooves 26. The small and large ends of the capacitor and portion 27 of plate 22 are further machined as shown in Figs. 2 and 3 and thereafter, a mounting ring 28 is applied adjacent the shoulder 11. This step is indicated by numeral 47 in Fig. 4.

A second metallizing process 48 is then applied. The second metallizing process may consist of flash coating with zinc, in the same manner as previously described, the portions of the outer plate shown in Figs. 2 and 3. Thereafter, the fillet 28 may be sprayed with aluminum and corona ring 23 may be similarly sprayed to bring it up to its required dimension. A final machining 49 may then be used to produce the required contours and dimensions of the capacitor.

By spraying the metal directly against the insulation, a coating is formed which makes it impossible for any air to be contained between the outer metallic cylinder and the insulation. Secondly, since the metal is applied while rather hot, but not hot enough to cause any damage to the insulation, the outer cylinder cools after being applied and consequently, contracts, and thus holds tightly against the insulation, eliminating all air voids.

It will be obvious that various configurations at the ends of the capacitor and any shape capacitor could be built using the principles herein described. For example, it will be evident that a nearly spherical or a semi-spherical capacitor may be formed by the method herein described. Since other modifications and variations of my invention will be apparent to those skilled in the art, I do not desire to be limited except as my invention is defined in the following claims.

I claim:

1. The method of making a capacitor which comprises the steps of winding on the outer surface of a smooth metallic member an insulating tape which shrinks lengthwise when heated, said tape being wound in a sufficient number of layers over the entire active capacitor area to provide a thickness greater than the desired final thickness of the capacitor insulation, baking the tape-wound member at temperatures which are increased gradually to the vicinity of several hundred degrees Fahrenheit, gradually cooling the baked member, machining the baked insulation to desired dimensions and coating the insulation with metal.

2. The method of making a capacitor which comprises the steps of winding on the outer surface of a smooth metallic circular member an insulating tape which shrinks lengthwise when heated, said tape being wound in a sufficient number of layers over the entire active capacitor area to provide a thickness greater than the desired final thickness of the capacitor insulation, baking the tape-wound member for several hours at temperatures which are increased gradually to the vicinity of several hundred degrees Fahrenheit, gradually cooling the baked member, machining the baked insulation to desired dimensions, coating the insulation with a machinable thickness of metal by spraying with hot metal, and machining the metallic coating to produce a smooth outer surface.

3. The method of making a capacitor which comprises the steps of forming a polished metallic substantially cylindrical member having a smoothly curved thickened rim at one end, winding on the outer surface of said member an insulating tape which shrinks lengthwise when heated, said tape being wound in a sufficient number of layers over the entire active capacitor area to provide a thickness greater than the desired final thickness of the capacitor insulation, baking the tape-wound member for several hours while increasing the temperature gradually to more than 200° F., gradually cooling the baked member, machining the baked insulation to desired dimensions, coating the insulation with a machinable thickness of metal by spraying with hot metal, and machining the metallic coating to produce a smooth outer surface.

4. The method according to claim 3, including the steps of forming the cylindrical member with circumferential shoulders near its ends, and applying the metallic coating to the portion of the cylindrical member between said shoulders.

5. The method according to claim 4, including the step of forming relatively thick circumferential beads of said metallic coating at the ends thereof.

6. The method according to claim 5, including the step of forming relatively thick circumferential beads of said insulation adjacent the beads of the metallic coating.

7. The method according to claim 6, including the step of producing circumferential grooves in said metallic and insulation beads.

8. The method of making a capacitor which comprises the steps of winding on the outer surface of a polished metallic cylindrical member an electron bombarded polyethylene insulating tape which shrinks lengthwise when heated, said tape being wound in a sufficient number of layers over the entire active capacitor area to provide a thickness greater than the desired final thickness of the capacitor insulation, baking the tape-wound member for several hours at temperatures which are gradually increased to about 300° F., gradually cooling the baked member, machining the baked insulation to desired dimensions, coating a portion of the insulation with metal by spraying with hot metal and forming an increased thickness of said insulation adjacent the ends of said metallic coating.

9. The method of making a capacitor which comprises the steps of coating the outer surface of a polished metallic cylindrical member with an electron bombarded polyethylene insulating material which shrinks lengthwise when heated, said coating being applied over the entire active capacitor area with a thickness greater than the desired final thickness of the capacitor insulation, baking the coated member for several hours at temperatures which are gradually increased to about 300° F., gradually cooling the baked member, machining the baked insulation to desired dimensions, coating a portion of the insulation with metal by spraying with hot metal, and forming an increased thickness of said insulation adjacent the ends of said metallic coating.

No references cited.